(12) United States Patent
Kim

(10) Patent No.: US 7,013,945 B2
(45) Date of Patent: Mar. 21, 2006

(54) ROLLER DRIVING APPARATUS OF LAMINATOR

(75) Inventor: Suk-Kyou Kim, Incheon-si (KR)

(73) Assignee: Royal Sovereign, Inc., (KR)

( * ) Notice: Subject to any disclaimer, the term of this patent is extended or adjusted under 35 U.S.C. 154(b) by 0 days.

(21) Appl. No.: 10/513,198

(22) PCT Filed: Sep. 13, 2002

(86) PCT No.: PCT/KR02/01726

§ 371 (c)(1),
(2), (4) Date: May 11, 2005

(87) PCT Pub. No.: WO03/092985

PCT Pub. Date: Nov. 13, 2003

(65) Prior Publication Data

US 2005/0224185 A1 Oct. 13, 2005

(30) Foreign Application Priority Data

May 2, 2002 (KR) .......................... 2002-13409 U
May 15, 2002 (KR) .......................... 2002-14788 U
May 15, 2002 (KR) .......................... 2002-14794 U

(51) Int. Cl.
*B32B 31/00* (2006.01)

(52) U.S. Cl. ...................... 156/555; 156/579; 156/582

(58) Field of Classification Search ................ 156/555, 156/556, 579, 580, 582, 583.1; 100/327, 100/155 R, 160, 176; 219/244; 425/368
See application file for complete search history.

(56) References Cited

U.S. PATENT DOCUMENTS 3,755,041 A * 8/1973 Membrino .................. 156/515
4,387,000 A * 6/1983 Tancredi ..................... 156/495
6,874,555 B1 * 4/2005 Hsiao ......................... 156/555

* cited by examiner

Primary Examiner—James Sells
(74) Attorney, Agent, or Firm—Saliwanchik, Lloyd & Saliwanchik

(57) ABSTRACT

A roller driving apparatus of a laminator includes a pair of supporting frames facing each other, upper and lower rollers formed between the supporting frames, upper and lower roller gears coupled with one end of the roller passing through one supporting frame to transfer rotational force to the roller and meshed with each other, connection gear selectively coupled to either the upper roller gear or the lower roller gear to transfer rotational force, motor disposed outside the one supporting frame and to which motor is fixed, motor gear fixed to rotational shaft of the motor, for selectively transferring the rotational force of the motor to the connection gear, manipulating means for manipulating transfer state of the rotational force from the motor gear to either the upper gear or the lower roller gear by moving the connection gear using external force of user, and fixing means for fixing manipulated location.

40 Claims, 15 Drawing Sheets

ROLLER DRIVING APPARATUS OF LAMINATOR

CROSS-REFERENCE TO RELATED APPLICATION

This application is the U.S. national stage application of International Patent Application No. PCT/KR02/01726, filed Sep. 13, 2002.

TECHNICAL FIELD

The present invention relates to a roller driving apparatus of a laminator, and more particularly, to a roller driving apparatus of a laminator, which drives a roller in the laminator performing a laminating operation by the roller that is operated by a one-way rotating motor. Specially, the present invention relates to a roller driving apparatus of a laminator, which is capable of controlling forward and backward rotations of the roller using a one-way rotating motor only through a user's simple manipulation in a small-sized laminator.

BACKGROUND ART

A laminator is a device that performs a coating operation using heat and pressure applied by a roller in a state that a to-be-coated plate-shaped member is inserted between laminating films.

FIG. 1 is a perspective view of a conventional small-sized laminator.

Referring to FIG. 1, the conventional small-sized laminator includes a roller 5 for applying a pressure to a pair of films FL of which one surface is in contact with the roller 5, plate-shaped supporting frames 1a and 1b for supporting both ends of the roller 5, roller gears 3 formed on an outer face of the plate-shaped supporting frame 1b to apply a rotational force to the roller 5, a motor gear 2 meshed with the roller gears 3 to transfer a rotational force of a motor M, and a manipulating panel for manipulating an operation of the laminator.

An operation of the above-described small-sized laminator will be described below. The rotational force of the motor M is transferred to the upper roller gear 3a by the motor gear 2, and the rotational force of the upper roller gear 3a is transferred to the lower roller gear 3b meshed with the upper roller gear 3a. Also, the rotational forces of the roller gears 3 are transferred to the roller 5 coupled with the roller gears 3. Then the films FL are pressed and heated by the roller 5 and is coated together with the plate-shaped member inserted between the upper film and the lower film.

Meanwhile, the small-sized laminator has a problem that the films are rolled to the roller 5 while the films are pressed and heated by the roller 5. Further, in case a user slantingly inserts the film, there is a problem that the films are distorted so that the coating operation is not performed correctly.

Hereinafter, it will be described methods applied to solve those problems according to the prior art.

One method is to disassemble the laminator to remove the film rolled to the roller. However, this method has an inconvenience that the procedure of disassembling the laminator should be entrusted to a technical expert.

Further, another method is to mount a motor rotatable in both forward and backward directions and to rotate the motor in the backward direction to pull out the film rolled to the roller 5. However, the bi-directional rotating motor rotatable in the backward direction is more expensive than the one-way rotating motor, and additional elements such as a condenser and a forward/backward rotating switch are needed. As a result, there is a problem that a manufacturing cost of the laminator is increased.

Particularly, since the small-sized laminator for home use or portable has such a simple structure that it is heated and pressed by one pair of rollers, it is much more inefficient to attach the bi-directional rotating motor, the condenser and the forward/backward rotating switch, which results in an increase of the manufacturing cost and the size of the laminator.

DISCLOSURE OF THE INVENTION

The present invention relates to a roller driving apparatus of a laminator. The roller driving apparatus of the laminator comprises: a pair of supporting frames facing each other; upper and lower rollers formed between the supporting frames; upper and lower roller gears coupled with each one end of the upper and lower rollers passing through one supporting frame, for transferring rotational force to the upper and lower rollers, wherein the upper and lower roller gears are meshed with each other; at least one connection gear selectively coupled to either the upper roller gear or the lower roller gear, for transferring rotational force; a motor fixing means disposed outside the one supporting frame, for fixing a motor; a motor gear fixed to a rotational shaft of the motor, for selectively transferring the rotational force of the motor to the connection gear; a manipulating means disposed between the one supporting frame and the motor fixing means, for manipulating a transfer state of the rotational force from the motor gear to either the upper roller gear or the lower roller gear by moving the connection gear using an external force of a user, wherein a center of the connection gear is coupled to the manipulating means; and a fixing means for stably fixing the manipulating means.

The roller driving apparatus of the laminator in accordance with the present invention can implement forward and backward rotations of the roller to the user's intensions by using only the driving of the motor rotating in one-way direction, thereby improving much more a convenience in a use of the laminator.

BEST MODE FOR CARRYING OUT THE INVENTION

Hereinafter, preferred embodiments of the present invention will be described in detail with reference to accompanying drawings. Here, the same reference numbers are assigned with respect to elements consisting of one pair and each of the pair is subdivided using an English letter.

First Embodiment

Figure 1:
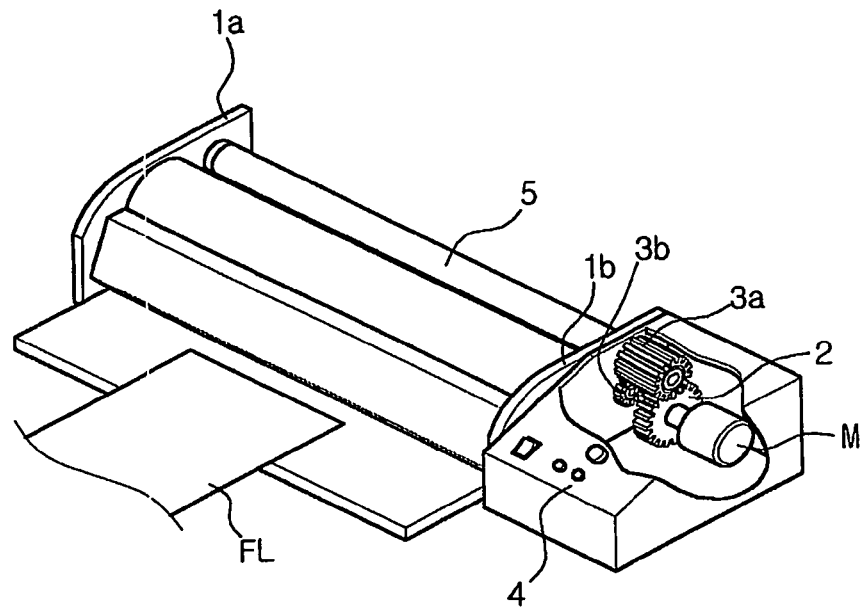
FIG. 1 is a perspective view of a conventional small-sized laminator.
Figure 2:
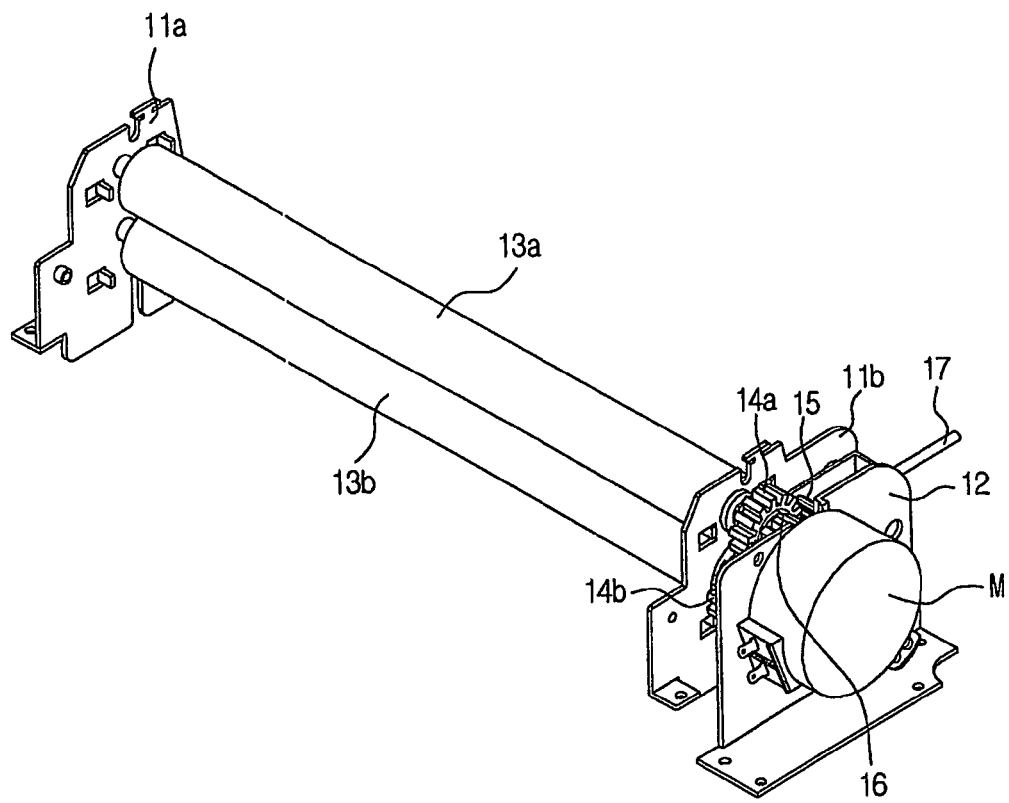
FIG. 2 is a perspective view showing a roller driving apparatus of a laminator in accordance with a first embodiment of the present invention.
Figure 3:
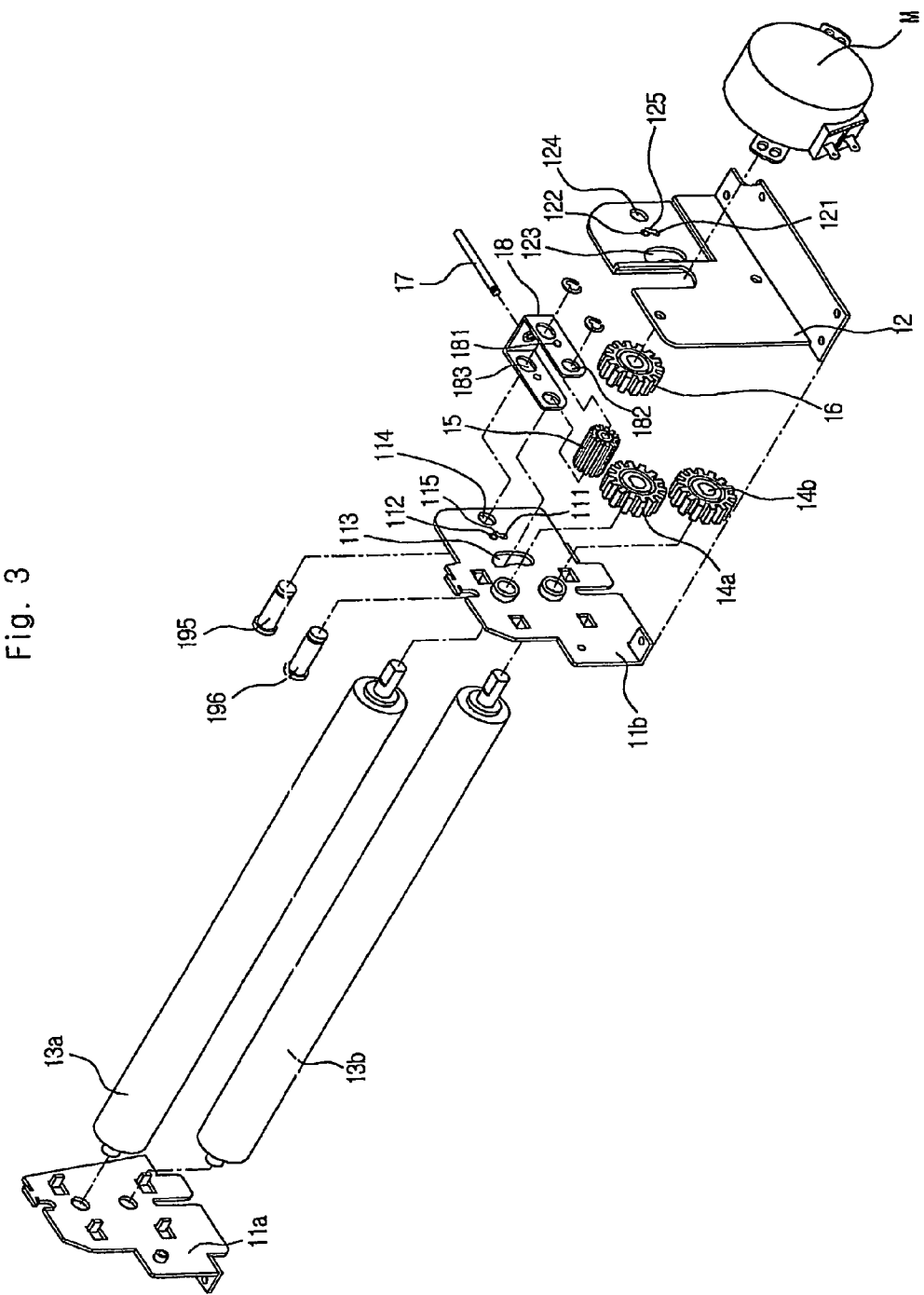
FIG. 3 is an exploded perspective view showing the roller driving apparatus of the laminator in accordance with the first embodiment of the present invention.

FIGS. 2 and 3 are a perspective view and an exploded perspective view showing a roller driving apparatus of a laminator in accordance with a first embodiment of the present invention, respectively.

Referring to FIGS. 2 and 3, the roller driving apparatus of the laminator includes supporting frames 11a and 11b facing each other, rollers 13a and 13b formed between the supporting frames 11, upper and lower roller gears 14a and 14b coupled with one end of the rollers 13 to transfer rotational forces of the rollers 13, a connection gear 15 selectively coupled to either the upper roller gear 14a or the lower roller gear 14b to transfer the rotational force, and a motor gear 16 selectively transferring a rotational force of a motor M to the connection gear 15.

Also, the roller driving apparatus of the laminator further includes a motor fixing member 12 and a manipulating member. The motor M is fixed to the motor fixing member 12. A manipulating member includes: a manipulating part 18 to whose one side both ends of the connection gear 15 are fixed; a manipulating bar 17 formed on the manipulating part 18 and extended to the other side of the manipulating part 18; a central shaft 195 inserted into the supporting frame 11b, the manipulating part 18 and the motor fixing member 12 to thereby become a rotational center of the manipulating part 18; and a guide shaft 196 inserted into the supporting frame 11b, the manipulating part 18, the connection gear 15 and the motor fixing member 12 to thereby guide a position of the connection gear 15.

In more detail, the manipulating part 18 includes: guide-shaft inserting holes 182 at which positions of both ends of the connection gear 15 are fixed, in which the guide shaft 196 is inserted into the connection gear 15; ellipse-shaped central-shaft inserting holes 183 at which the manipulating part 18 is movable in right and left directions by a predetermined distance in a state that the central shaft 195 is inserted thereinto; and hanging protrusions 181 formed protrusively at a central portion between the guide-shaft inserting holes 182 and the central-shaft inserting holes 183 to thereby support correctly the manipulated position of the manipulating part 18.

Further, both the supporting frame 11b and the motor fixing member 12 include circular fixing holes 114 and 124 into which the central shaft 195 is inserted and arc-shaped guide holes 113 and 123 into which the guide shaft 196 is inserted. Also, both the supporting frame 11b and the motor fixing member 12 include upper hanging holes 112 and 122, stopping holes 115 and 125 and lower hanging holes 111 and 121, to which the hanging protrusions 181 are hanged, so that the position of the manipulating part 18 is correctly supported.

Furthermore, the manipulating bar 17 can be formed as one body together with the manipulating part 18, and also can be later coupled with a screw by forming a screw thread on a portion into which the manipulating bar 17 is to be inserted.

Meanwhile, the roller gears 14 are not meshed directly with the motor gear 16 and the rotational force is transferred to the roller gear 14 in a state that the connection gear 15 is engaged. Also, to mesh the connection gear 15 with both the roller gears 14 and the motor gear 16, a body of the connection gear 15 is formed long.

An operation of the roller driving apparatus of the laminator in accordance with the first embodiment of the present invention will be described with reference to the above-described structure.

If a user wants the motor to be rotated in a forward or backward direction or wants the motor to be stopped, a coupling state of the connection gear 15 can be changed by applying an external force to the manipulating bar 17 in up and down directions. In more detail, the forward rotation can be achieved by meshing the connection gear 15 with both the motor gear 16 and the upper connection gear 14a. However, the backward rotation can be achieved by setting the rotational direction of the motor to the forward rotation and meshing the connection gear 15 with both the motor gear 16 and the lower connection gear 14b. Additionally, the user can directly remove the film FL from the rollers 13 by setting the manipulating part 18 to a state that the connection gear 15 is not meshed with anything else.

Further, to correctly support the manipulating part 18 at a predetermined position set by the user, it is noted that the hanging protrusions 181 formed on both sides of the manipulating part 18 should be positioned at either of the upper hanging holes 112 and 122, the stopping holes 115 and 125 or the lower hanging holes 111 and 121 lest that the hanging protrusions 181 should be taken out.

Furthermore, in order to enable the user to move the position of the manipulating part 18, the guide holes 113 and 123 is formed in an arc shape and in a progressive direction of the guide shaft 196, and the central-shaft inserting holes 183 into which the central shaft 195 is inserted is formed in an ellipse shape.

An operation of the roller driving apparatus of the laminator will be described below in detain with reference to additional drawings based on the above description.

Figure 4:
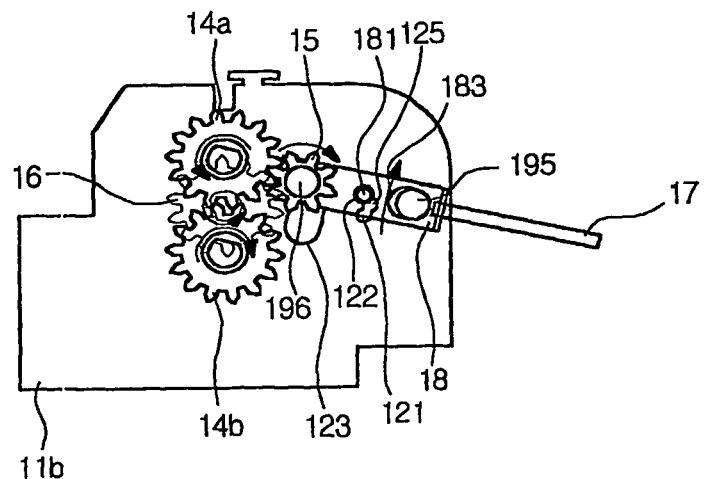
FIG. 4 is a view explaining a forward rotation state of the roller in the first embodiment of the present invention.
Figure 5:
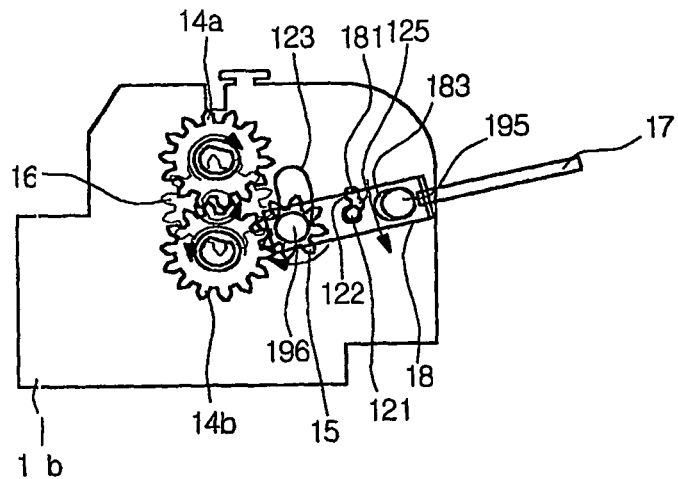
FIG. 5 is a view explaining a backward rotation state of the roller in the first embodiment of the present invention.
Figure 6:
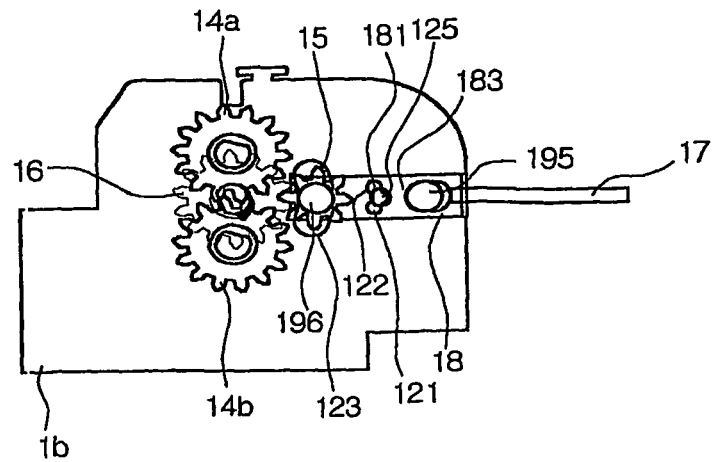
FIG. 6 is a view explaining a stopping state of a roller in the first embodiment of the present invention.

FIGS. 4 to 6 are views explaining a forward rotation state, a backward rotation state and a stopping state of the roller in the first embodiment of the present invention, respectively.

Referring to FIG. 4, the connection gear 15 is meshed with both the motor gear 16 and the upper roller gear 14a. In other words, the rotational force of the motor M is transferred to the upper roller gear 14a through the motor gear 16, the connection gear 15 and the upper roller gear 14a. At this time, since the lower roller gear 14b is meshed with the upper roller gear 14a, the lower roller gear 14b has the same number of rotations as the upper roller gear 14a and transfers the rotational force to the lower roller 13b.

In such a state that the roller is rotated in the forward direction, the hanging protrusions 181 are inserted into the upper hanging holes 112 and 122 to thereby fix each position of the manipulating part 18 and the connection gear 15.

Also, rotational directions of arrows shown in FIG. 4 represent those of respective gears.

Referring to FIG. 5, the connection gear 15 is meshed with both the motor gear 16 and the lower roller gear 14b. In other words, the rotational force of the motor M is transferred to the lower roller 13b (referring to FIG. 3) through the motor gear 16, the connection gear 15 and the lower roller gear 14b. At this time, the upper roller gear 14a is meshed with the lower roller gear 14b, so that the upper roller gear 14a has the same number of rotations as the lower roller gear 14b and transfers the rotational force to the upper roller 13a (referring to FIG. 3).

In such a state that the roller is rotated in the backward direction, the hanging protrusions 181 are inserted into the lower hanging holes 111 and 121 so that each position of the manipulating part 18 and the connection gear 15 is fixed.

Meanwhile, to achieve a smooth movement of the connection gear 15 while the user changes the position of the manipulating part 18 using the manipulating bar 17, the guide holes 113 and 123 into which the guide shaft 196 is inserted is formed in an arc shape and the central-shaft inserting holes 183 into which the central shaft 195 is inserted is formed in an ellipse shape. With these topologies and structures, the connection gear 15 can be smoothly inserted into or taken out from the roller gears 14 and the motor gear 16.

Although the motor M is rotated in the forward direction at the backward rotation state of the roller, the roller 13 is rotated in the backward direction so that the film FL is removed. After the film FL is all removed, the coating operation can be again performed by setting the position of the manipulating part 18 to the forward rotation state.

Referring to FIG. 6, the connection gear 15 is not meshed with any of the motor gear 16 and the roller gears 14. In other words, the rotational force of the motor M is not transferred, but also the roller gears 14 are independently rotated regardless of the motor gear 16. In such a state, the user can oneself pull out the film to remove it from the laminator.

In such a stopping state of the roller, the hanging protrusions 181 are inserted into the stopping holes 115 and 125 so that each position of the manipulating part 18 and the connection gear 15 is fixed.

Even when the operation of the laminator is stopped for other reasons except that the film is not removed even using the backward rotation of the rollers 13 or the film is rolled to the roller 13, the stopping state shown in FIG. 6 can be also applied to a case that the film is removed toward the outside of the laminator by pulling out the film inserted into the laminator.

Meanwhile, in case the forward rotational direction of the motor is changed to the opposite, the rotational directions of FIGS. 4 and 5 are also changed to the opposite, so that the positions of the forward and backward rotations can be changed.

Further, a smooth movement of the shaft can be secured by inserting a plurality of washers into positions which the central shaft 195 and the guide shaft 196 are inserted into, and a more firm coupling can also be achieved by applying screws to coupling portions.

Second Embodiment

A roller driving apparatus of a laminator in accordance with a second embodiment of the present invention includes supporting frames 21a and 21b, rollers 23a and 23b, a motor gear 26 coupled to a motor, and a motor fixing member 22, all of which are the same elements as the first embodiment of the present invention. Meanwhile, compared with the first embodiment of the present invention, the second embodiment of the present invention has differences in connection gears 25a and 25b, a manipulating member 27 applying an external force of the user and a structure related to a coupling between the connection gears 25 and the manipulating member 27. The roller driving apparatus of the laminator in accordance with the second embodiment of the present invention will be described below in detail focusing on the different elements from the first embodiment of the present invention.

Figure 7:
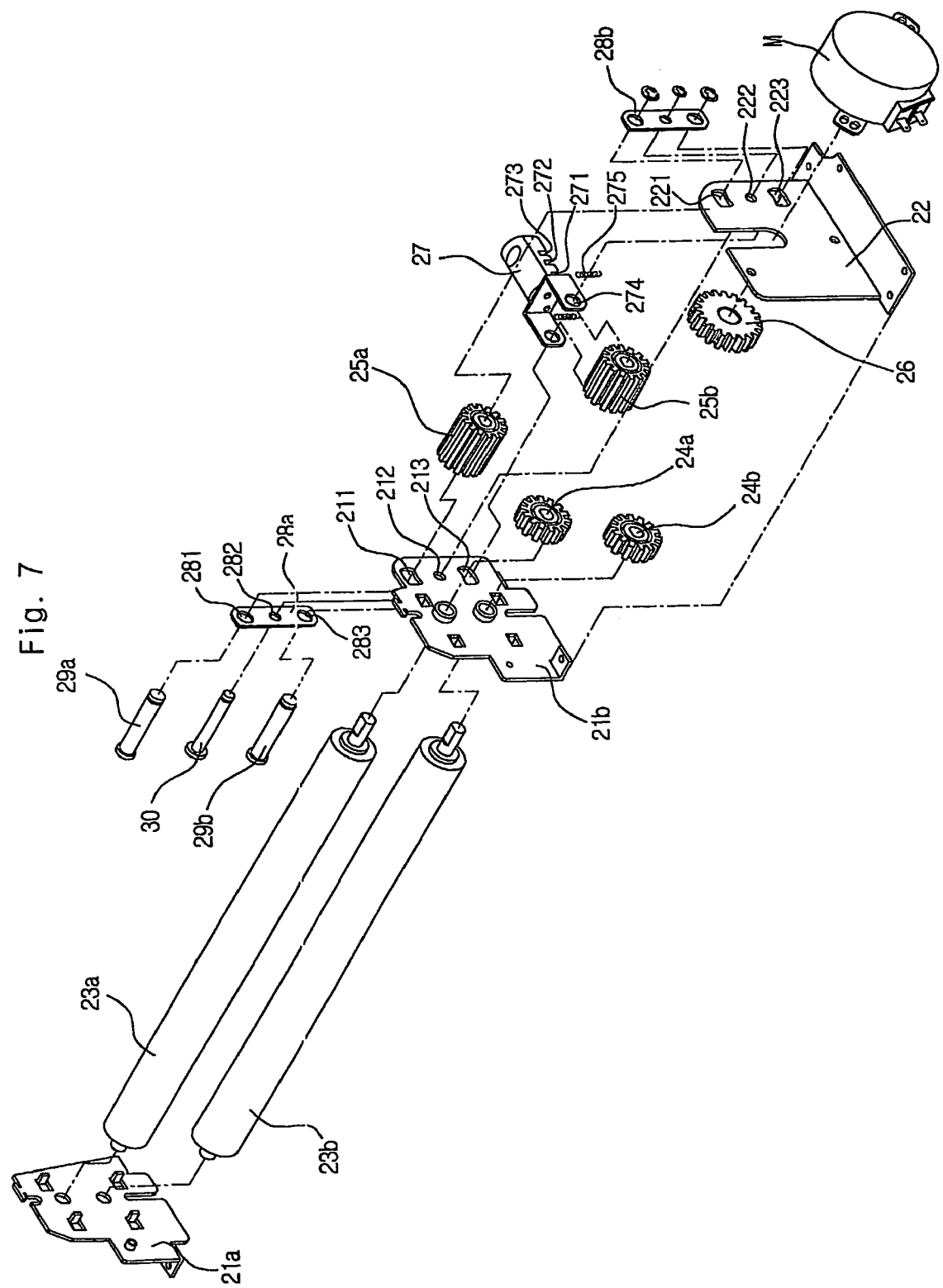
FIG. 7 is an exploded perspective view showing a roller driving apparatus of a laminator in accordance with a second embodiment of the present invention.

FIG. 7 is an exploded perspective view showing the roller driving apparatus of the laminator in accordance with the second embodiment of the present invention.

Referring to FIG. 7, the roller driving apparatus of the laminator includes: a pair of upper and lower connection gears 25a and 25b; upper and lower gear shafts 29a and 29b inserted into central axes of the upper and lower connection gears 25a and 25b; a pair of link panels 28a and 28b into which the upper and lower gear shafts 29a and 29b are inserted so as to be moved in relation to the upper and lower gear shafts 29a and 29b; and a central shaft 30 serving as a rotational center of the link panels 28.

Also, the roller driving apparatus of the laminator further includes a manipulating member 27 for manipulating forward and backward rotations of the rollers 23 using the external force of the user, in which gear inserting holes 274 for supporting the lower connection gear 25b are formed thereon.

In more detail, the manipulating member 27 includes the gear inserting holes 274 and three hanging grooves 271, 272 and 273. The lower connection gear 25b is internally inserted into the gear inserting holes 274, and the lower gear shaft 29b, i.e., a central shaft of the lower connection gear 25b, is inserted thereinto, so that the lower connection gear 25b is supported. The three hanging grooves 271, 272 and 273 are used to stably maintain the forward rotation, backward rotation and stopping states of the rollers 23.

Also, the upper and lower gear shafts 29a and 29b are inserted into the link panels 28a and 28b, the supporting frame 21b, the connection gears 25 and the motor fixing member 22. Particularly, the lower gear shaft 29b is also inserted into the manipulating member 27, so that the lower gear shaft 29b is moved according to the external force applied by the user. An operation of the lower gear shaft 29b is also transferred to the upper gear shaft 29a by the link panels 28 to thereby control the transfer of the rotational force of the motor.

To couple the connection gears 25, the link panels 28 include upper gear holes 281 into which the upper gear shaft 29a is inserted, lower gear holes 283 into which the lower gear shaft 29b is inserted, and central holes 282 into which the central shaft 30 is inserted.

Further, the supporting frame 21b and the motor fixing member 22 include upper shaft guides 211 and 221 and lower shaft guides 213 and 223 into which the upper gear shaft 29a and the lower gear shaft 29b are respectively inserted, and circular central holes 212 and 222 into which the central shaft 30 is inserted. Particularly, the upper shaft guides 211 and 221 and the lower shaft guides 213 and 223 are formed in an arc shape so that the upper gear shaft 29a and the lower gear shaft 29b can be properly moved in left and right directions according to the change of positions of the connection gears 25.

An operation of the roller driving apparatus of the laminator in accordance with the second embodiment of the present invention will be described below with reference to the above-described construction.

If the user moves the manipulating member 27 backward and forward directions to move the lower connection gear 25b coupled thereto, the link panels 28 into which the lower connection gear 25b is inserted are also rotated around the central shaft 30. The rotation of the link panels 28 results in that of the upper gear shaft 29a, so that the positions of the upper and lower connection gears 25a and 25b are entirely changed.

Also, the upper shaft guides 211 and 221 and the lower shaft guides 213 and 223 are formed on the supporting frame 21b and the motor fixing member 22 in the arc shape, thereby guiding the rotation of the link panels 28 and the movement of the upper and lower gear shafts 29a and 29b.

Meanwhile, since the change of the position of the connection gears 25 results in that of the mesh of the motor gear 26 with the roller gear 24, the transfer direction of the rotational force is changed, so that the forward and backward rotations of the rollers 23 are manipulated to the user's intentions.

Figure 8:
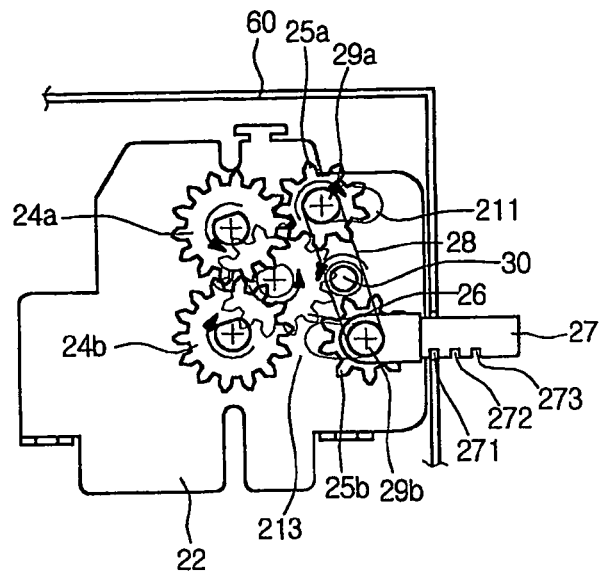
FIG. 8 is a view explaining a forward rotation state of the roller in the second embodiment of the present invention.
Figure 9:
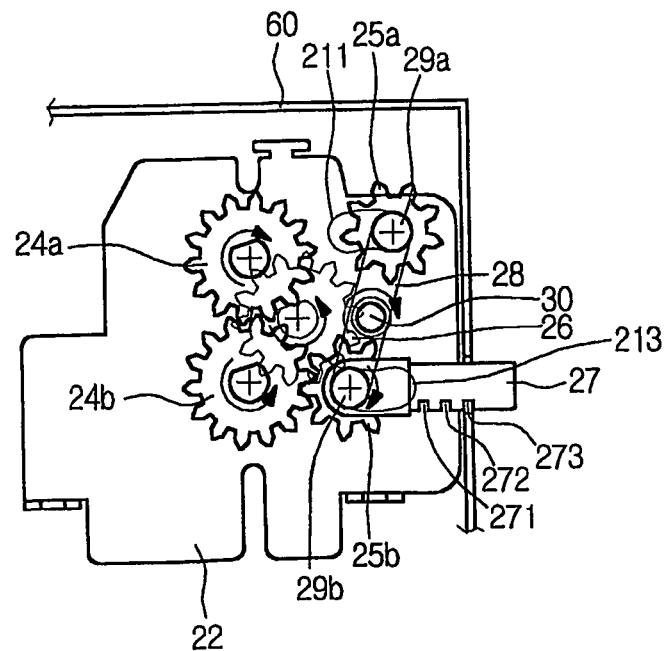
FIG. 9 is a view explaining a backward rotation state of the roller in the second embodiment of the present invention.
Figure 10:
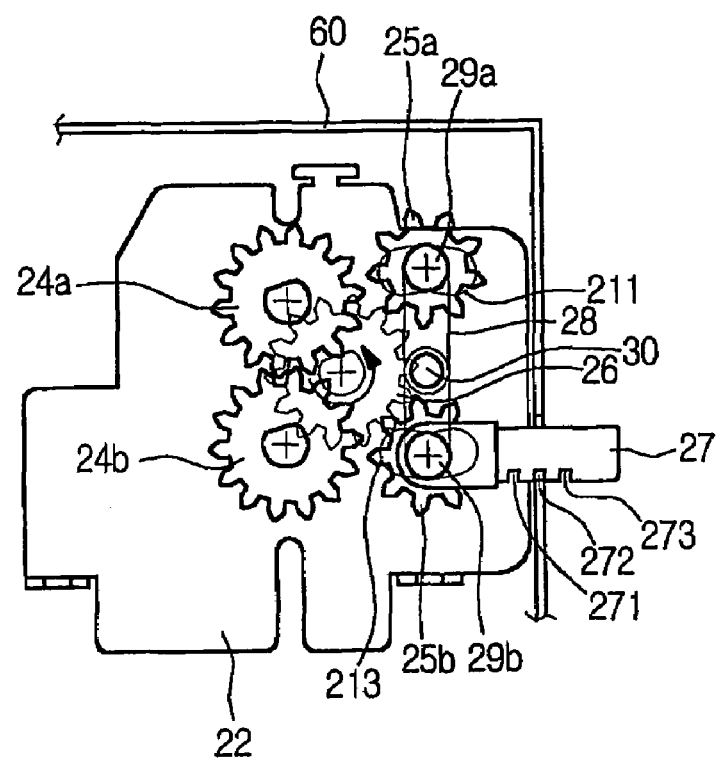
FIG. 10 is a view explaining a stopping state of the roller in the second embodiment of the present invention.

FIGS. 8 to 10 are views explaining a forward rotation state, a backward rotation state and a stopping state of the roller in the second embodiment of the present invention, respectively.

Referring to FIG. 8, in case the user pulls out the manipulating member 27 to change the position of the link panels 28 in a counterclockwise direction, the upper connection gear 25a is meshed with the motor gear 26 and the upper roller gear 24a. In the end, the rotational force of the motor is transferred to the upper roller 23a through the motor gear 26, the upper connection gear 25a and the upper roller gear 24a. Then, the upper roller gear 24a is meshed with the lower roller gear 24b to generate the rotational force of the lower roller gear 24b, so that the lower roller 23b is also rotated with the same number of the rotations as the upper roller 24a.

At this time, the link panels 28 are in a state that it is rotated in the counterclockwise direction around the central shaft 30. The upper gear shaft 29a is in contact with a left side of the arc-shaped upper shaft guide 211 and the lower gear shaft 29b is in contact with a right side of the arc-shaped lower shaft guide 213, thereby setting its position. Since a first hanging groove 271 formed on a bottom of the manipulating member 27 is inserted into a panel of an external case 60, the manipulating member 27 is not taken out unless a constant external force is applied thereto, so that the mesh of the upper connection gear 25a is not taken out even by a torque applied when the upper connection gear 25a is rotated.

Meanwhile, to fix the first hanging groove 271 more firmly, a spring 275 (referring to FIG. 7) is formed which vertically couples the manipulating member 27, the supporting frame 21b and the motor fixing member 22. The spring 275 generates a tension that pulls downward the manipulating member 27 lest the first hanging groove 271 should be taken out from the external case 60.

Referring to FIG. 9, in case the user pushes the manipulating member 27 to change the position of the link panels 28 in a clockwise direction, the lower connection gear 25b is meshed with the motor gear 26 and the lower roller gear 24b. In the end, the rotational force of the motor is transferred to the lower roller 23b through the motor gear 26, the lower connection gear 25b and the lower roller gear 24b. Then, the lower roller gear 24b is meshed with the upper roller gear 24a to generate the rotational force of the upper roller gear 24a, so that the upper roller 23a is also rotated with the same number of the rotations as the lower roller 24b.

At this time, the link panel 28 is in a state that it is rotated in the clockwise direction around the central shaft 30. The upper gear shaft 29a is in contact with a right side of the arc-shaped upper shaft guide 211 and the lower gear shaft 29b is in contact with a left side of the arc-shaped lower shaft guide 213, thereby setting its position. Since a third hanging groove 273 formed on the bottom of the manipulating member 27 is inserted into the panel of the external case 60, the manipulating member 27 is not taken out unless a constant external force is applied thereto, so that the mesh of the lower connection gear 25b is not taken out even by a torque applied when the lower connection gear 25b is rotated.

Meanwhile, to fix the third hanging groove 273 more firmly, the spring 275 (referring to FIG. 7) is formed which vertically couples the manipulating member 27, the supporting frame 21b and the motor fixing member 22. The spring 275 generates a tension that pulls downward the manipulating member 27 lest the third hanging groove 273 should be taken out from the external case 60.

Referring to FIG. 10, the user applies an external force to the manipulating member 27 to insert a second hanging groove 272 into the panel of the external case 60. At this time, in a state that the link panels 28 are vertically set, the connection gears 25 are not meshed with any of the roller gears 24. Thus, the rotational force of the motor M is not transferred to the rollers 23.

At this time, the user oneself can remove the rolled film from the laminator by pulling out the rolled film.

Meanwhile, to fix the second hanging groove 272 more firmly, the spring 275 (referring to FIG. 7) is formed which vertically couples the manipulating member 27 to generate a tension that pulls downward the manipulating member 27 lest the second hanging groove 272 should be taken out from the external case 60.

Meanwhile, in case a forward rotational direction of the motor is changed to the opposite, the rotational directions of FIGS. 8 and 9 are also changed, so that the positions of the forward and backward rotations can be changed.

Further, a smooth movement of the shaft can be secured by inserting a plurality of washers into positions which the central shaft 195 and the guide shaft 196 are inserted into, and a more firm coupling can also be achieved by applying screws to coupling portions.

Third Embodiment

In a roller driving apparatus of a laminator in accordance with a third embodiment of the present invention, the supporting frames 21a and 21b, the rollers 23a and 23b, the motor gear 26 coupled to the motor, and the motor fixing member 22, all of which are described as the second embodiment of the present invention with reference to FIGS. 7 to 10, are also applied to the third embodiment of the present invention. Meanwhile, compared with the second embodiment of the present invention, the third embodiment of the present invention has differences in the connection gears 25a and 25b, the manipulating member 27 applying the external force of the user and the structure related to the coupling between the connection gears 25 and the manipulating member 27. The roller driving apparatus of the laminator in accordance with the third embodiment of the present invention will be described below in detail focusing on the different elements from the second embodiment of the present invention.

Figure 11:
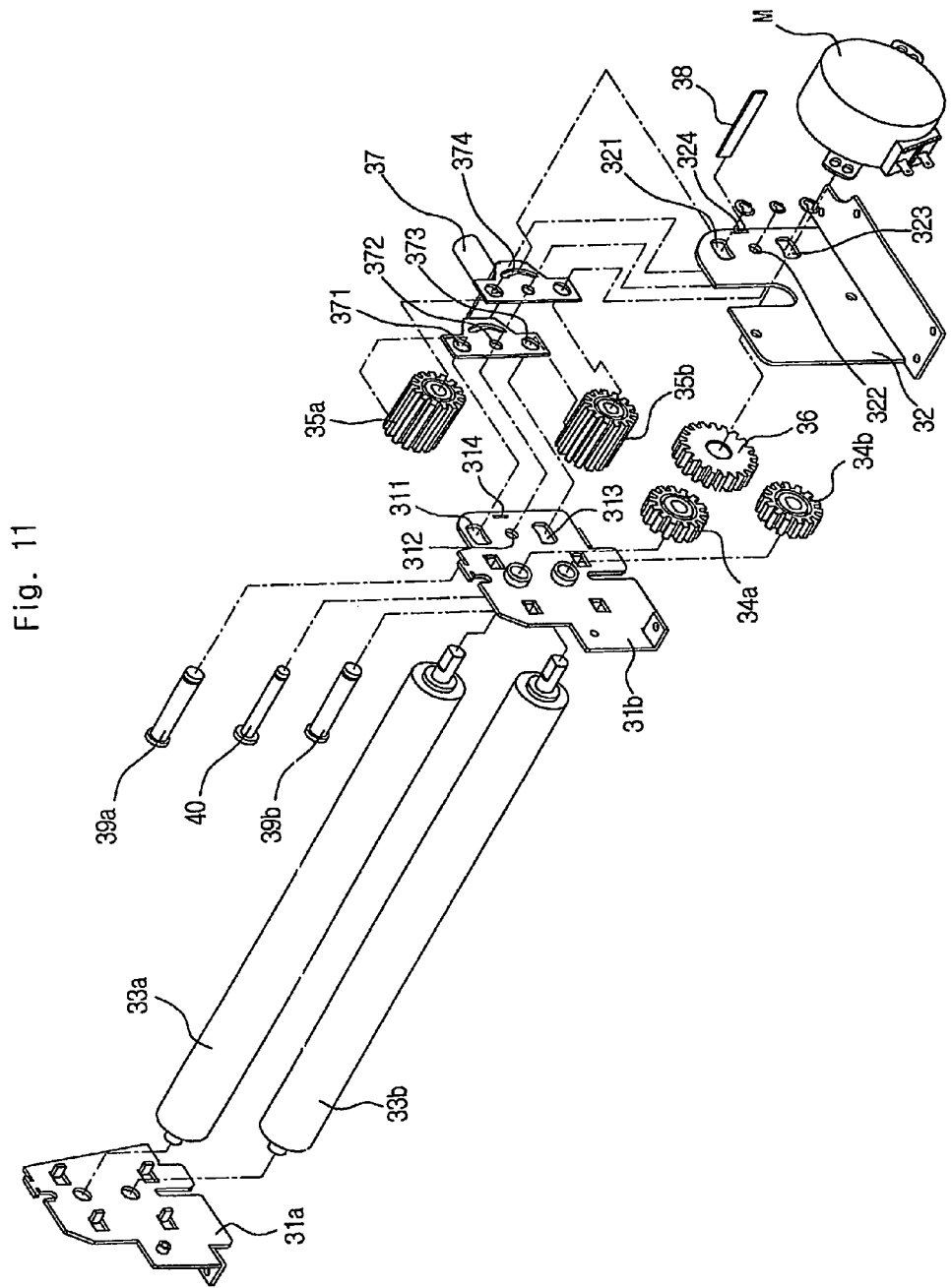
FIG. 11 is an exploded perspective view showing a roller driving apparatus of a laminator in accordance with a third embodiment of the present invention.

FIG. 11 is an exploded perspective view showing the roller driving apparatus of the laminator in accordance with the third embodiment of the present invention.

Referring to FIG. 11, the roller driving apparatus of the laminator includes: upper and lower connection gears 35a and 35b forming one pair; upper and lower gear shafts 39a and 39b inserted into central axes of the upper and lower connection gears 35a and 35b; a manipulating member 37 into which the upper and lower gear shafts 39a and 39b are inserted so as to be movable in relation to the upper and lower gear shafts 39a and 39b; and a fixing spring 38 stably fixing positions of a central shaft 40 and the manipulating member 37 around the rotational center of the manipulating member 37.

In more detail, the manipulating member 37 includes upper and lower shaft fixing holes 371 and 373 and a spring guide 374. The upper and lower connection gears 35a and 35b are internally inserted into the upper and lower fixing holes 371 and 373, and the central shafts of the upper and lower connection gears 35, i.e., the upper and lower gear shafts 39a and 39b, are inserted thereinto, so that the upper and lower connection gears 35 are supported. The spring guide 374 has two guide faces that are in contact with central-shaft fixing holes 372 into which the central shaft 40 is inserted and a fixing spring 38 to thereby fix the position of the manipulating member 37.

Also, the upper and lower gear shafts 39a and 39b are inserted into the supporting frame 31b, the connection gears 35, the motor fixing member 32 and specially the manipulating member 37, so that the mesh state of the connection gears 35 is changed according to an external force applied by the user.

Further, the supporting frame 31b and the motor fixing member 22 include upper shaft guides 311 and 321 and lower shaft guides 313 and 323 into which the upper and lower gear shafts 39a and 39b are respectively inserted, and circular central holes 312 and 322 into which the central shaft 40 is inserted. Particularly, the upper shaft guides 311 and 321 and the lower shaft guides 313 and 323 are formed in an arc shape so that the upper and lower gear shafts 39a and 39b can be properly moved in left and right directions according to a change of positions of the connection gears 35. Furthermore, in order that the position of the fixing spring 38 is correctly fixed at both front and rear ends, spring inserting holes 314 and 324 having the same outward shape as the fixing spring 38 are further formed on each one side of the supporting frame 31b and the motor fixing member 32. However, the position of the fixing spring 38 can be fixed by pushing into the spring inserting holes 314 and 324.

An operation of the roller driving apparatus of the laminator in accordance with the third embodiment of the present invention will be described below with reference to the above-described structure.

If the user moves the manipulating member 37 in upward and downward directions to move the upper and lower connection gear 35a and 35b inserted into the manipulating member 37, the upper and lower connection gears 35a and 35b are meshed with the upper and lower roller gears 34a and 34b or are separated, so that the transfer direction of the rotational force is changed into forward or backward directions and then the rotational force is transferred.

Also, the upper shaft guides 311 and 321 and the lower shaft guides 313 and 323 are formed on the supporting frame 31b and the motor fixing member 32 in the arc shape, thereby guiding the movement of the upper and lower gear shafts 39a and 39b.

Meanwhile, the change of the position of the connection gears 35 results in that of the mesh of the motor gear 36 with the roller gears 34 to thereby change the transfer direction of the rotational force, so that the forward and backward rotations of the rollers 33 are manipulated to the user's intentions.

Figure 12:
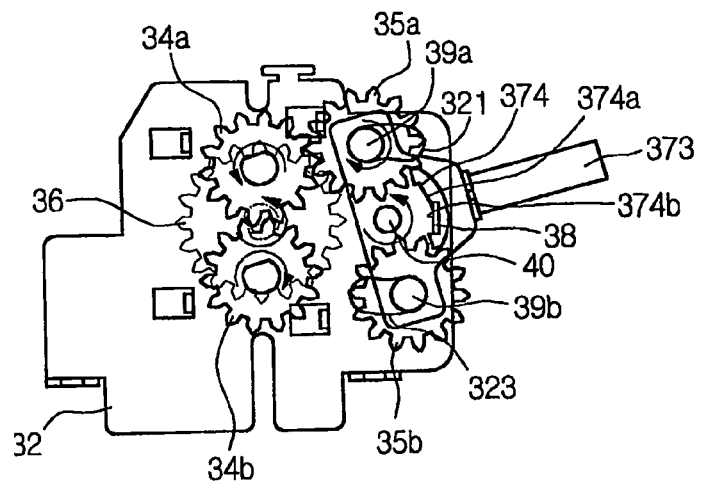
FIG. 12 is a view explaining a forward rotation state of the roller in the third embodiment of the present invention.
Figure 13:
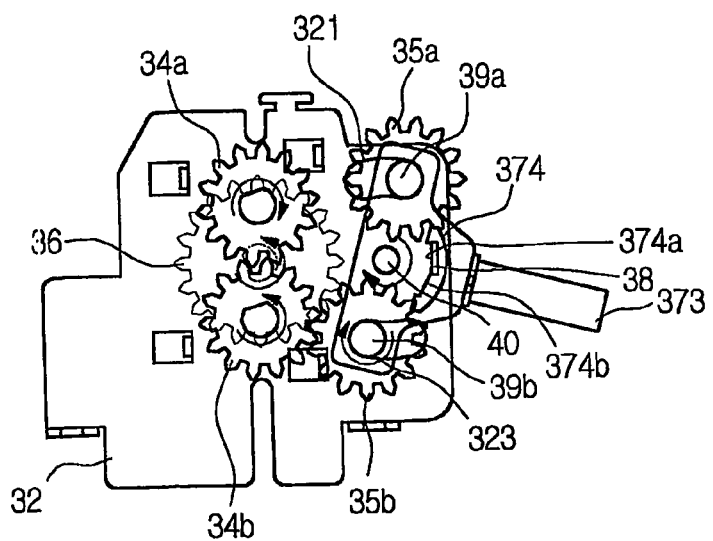
FIG. 13 is a view explaining a backward rotation state of the roller in the third embodiment of the present invention.
Figure 14:
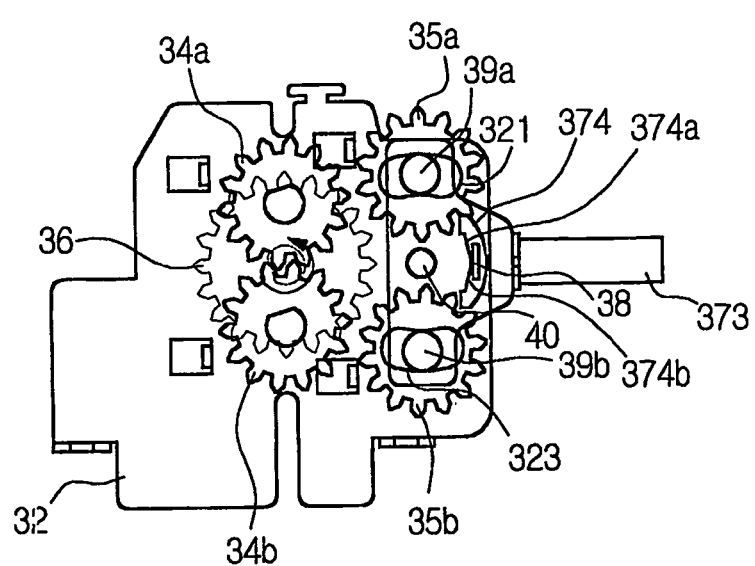
FIG. 14 is a view explaining a stopping state of the roller in the third embodiment of the present invention.

FIGS. 12 to 14 are views explaining a forward rotation state, a backward rotation state and a stopping state of the roller in the third embodiment of the present invention, respectively.

Referring to FIG. 12, in case the user pushes upwards the manipulating member 37 to change the position of the manipulating member 37 in a counterclockwise direction, the upper connection gear 35a is meshed with the motor gear 36 and the upper roller gear 34a. In the end, the rotational force of the motor is transferred to the upper roller 33a through the motor gear 36, the upper connection gear 35a and the upper roller gear 34a. Then, the upper roller gear 34a is meshed with the lower roller gear 34b to generate the rotational force of the lower roller gear 34b, so that the lower roller 33b is also rotated with the same number of the rotations as the upper roller 34a.

At this time, the manipulating member 37 is in a state that it is rotated in the counterclockwise direction around the central shaft 40. The upper gear shaft 39a is in contact with a left side of the arc-shaped upper shaft guide 321 and the lower gear shaft 39b is in contact with a right side of the arc-shaped lower shaft guide 323, thereby setting its position. The fixing spring 38 is in contact with a second guide face 374b of the spring guide 374 to apply a predetermined force to the manipulating member 37, so that the mesh of the upper connection gear 35a is not taken out even by a torque applied to the manipulating member 37 when the upper connection gear 35a is rotated.

Referring to FIG. 13, in case the user pushes downward the manipulating member 37 to rotate the position of the manipulating member 37 in a clockwise direction, the lower connection gear 35b is meshed with the motor gear 36 and the lower roller gear 34b. In the end, the rotational force of the motor is transferred to the lower roller 33b through the motor gear 36, the lower connection gear 35b and the lower roller gear 34b. Then, the lower roller gear 34b is meshed with the upper roller gear 34a to generate the rotational force of the upper roller gear 34a, so that the upper roller 33a is also rotated with the same number of the rotations as the lower roller 34b.

At this time, the manipulating member 37 is in a state that it is rotated in the clockwise direction around the central shaft 40. The upper gear shaft 39a is in contact with a right side of the arc-shaped upper shaft guide 321 and the lower gear shaft 39b is in contact with a left side of the arc-shaped lower shaft guide 323, thereby setting its position. The fixing spring 38 is in contact with a first guide face 374a of the spring guide 374 to apply a predetermined force to the manipulating member 37, so that the mesh of the upper connection gear 35a is not taken out even by a torque applied to the manipulating member 37 when the upper connection gear 35a is rotated.

Referring to FIG. 14, in case the user applies an external force to the manipulating member 37 to contact the fixing spring 38 with an edge of a central portion of the spring guide 374 without any contact with the guide faces 374a and 374b of the spring guide 374. At this state, any connection gears 35 are not meshed with the roller gears 34. Thus, the rotational force of the motor M is not transferred to the rollers 33. Also, it is possible to obtain a more stable operation by forming the spring guide with three faces At this time, the user oneself can remove the rolled film from the laminator by pulling it out. However, the user should continuously hold the manipulating member 37 while removing the film FL.

However, since the force is applied by the fixing spring 38 and the spring guide 374, the present invention has an effect to set more smoothly and easier the forward and backward rotations of the motor through the manipulating member 37.

Meanwhile, in case the forward rotational direction of the motor is changed to the opposite, the rotational directions of FIGS. 12 and 13 are also changed, so that the positions of the forward and backward rotations can be changed.

Further, a smooth movement of the shaft can be secured by inserting a plurality of washers into positions which the central shaft 195 and the guide shaft 196 are inserted into, and a more firm coupling can also be achieved by applying screws to coupling portions.

Fourth Embodiment

A roller driving apparatus of a laminator in accordance with a fourth embodiment of the present invention is identical to the above-described third embodiment in many respects. However, it is characteristic of this invention to include an additional structure to fix the position of the manipulating member 37 to the moved position after the manipulating member 37 is moved so as to set the rotational direction of the roller 33. Hereinafter, the additional structure of the manipulating member 37 will be described in detail.

Figure 15:
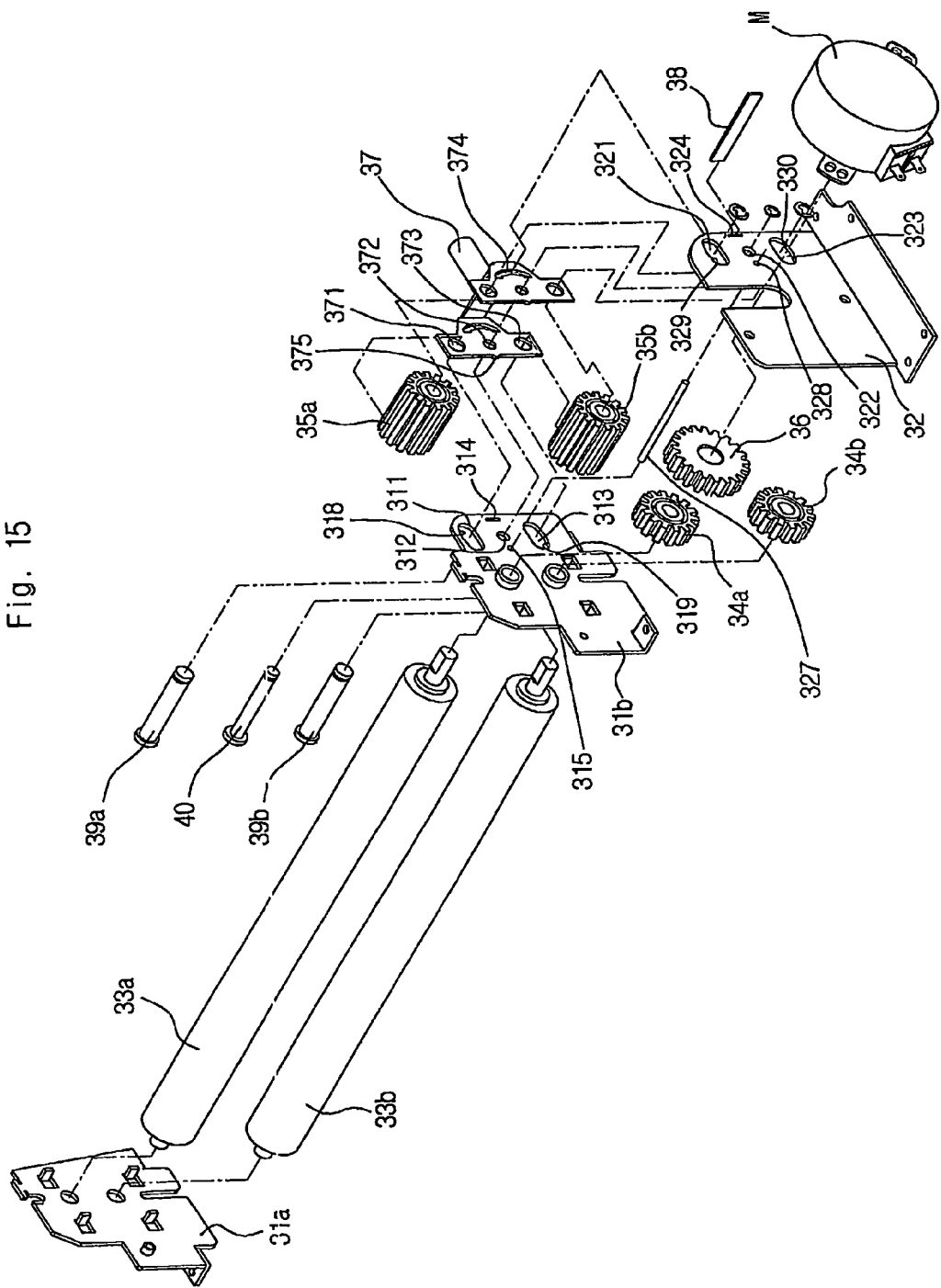
FIG. 15 is an exploded perspective view showing a roller driving apparatus of a laminator in accordance with a fourth embodiment of the present invention.

FIG. 15 is an exploded perspective view showing the roller driving apparatus of the laminator in accordance with the fourth embodiment of the present invention.

Referring to FIG. 15, the fifth embodiment of the present invention includes two additional structures for firmly fixing the position of the manipulating member 37.

A first structure includes supporting bar inserting holes 315 and 328, a supporting bar 327 and supporting bar hanging projections 375. The supporting bar inserting holes 315 and 328 are formed on predetermined positions of a right supporting frame 31b and a motor fixing member 32, respectively. Both ends of the supporting bar 327 are inserted into the supporting bar inserting holes 315 and 328 and are fixed thereto. The supporting bar hanging projections 375 are protrusively formed on both ends of the manipulating member 37, thereby being in contact with the supporting bar 327. Meanwhile, it is desirable that the supporting bar 327 should be formed of a piano wire so as to maintain predetermined elasticity and strength.

Explaining an operation of the first structure, after the manipulating member 37 is moved upward or downward, the manipulating member 37 is hung between the supporting bar 327 and the supporting bar hanging projections 375, so that the position of the manipulating member 37 is fixed.

Also, as a second structure, protrusions 318, 319, 329 and 330 are further formed. The protrusions 318, 319, 329 and 330 fix positions of the upper and lower gear shafts 39a and 39b through the upper shaft guides 311 and 321 and the lower shaft guides 313 and 323. It is desirable that the protrusions 318, 319, 329 and 330 should be formed on an outside of the central shaft 40.

Explaining the second structure, after the protrusions 318, 319, 329 and 330 are moved to one side, the protrusions 318, 319, 329 and 330 firmly fix the positions of the upper and lower gear shaft 39a and 39b so that the upper and lower gear shafts 39a and 39b may not be taken out unless a force is applied beyond a predetermined strength. Meanwhile, to make it possible to move the positions of the upper and lower gear shafts 39a and 39b by a predetermined force, it is desirable that at least one of the manipulating member 37 and/or the upper gear shaft 39a and the lower gear shaft 39b and/or the motor fixing member 32 and the right supporting frame 31b are formed of a plastic material with elasticity.

Figure 16:
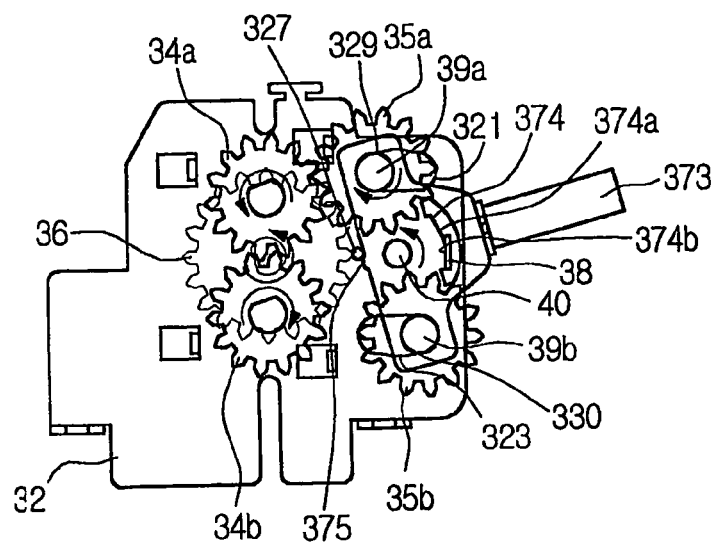
FIGS. 16, 17 and 18 are view explaining a forward rotation state, a backward rotation state, and a stopping state of the roller in the fourth embodiment of the present invention.
Figure 17:
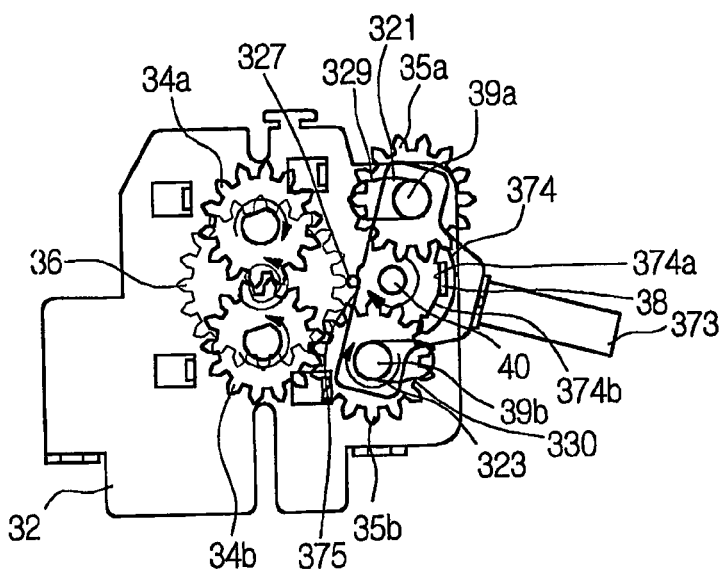
Figure 18:
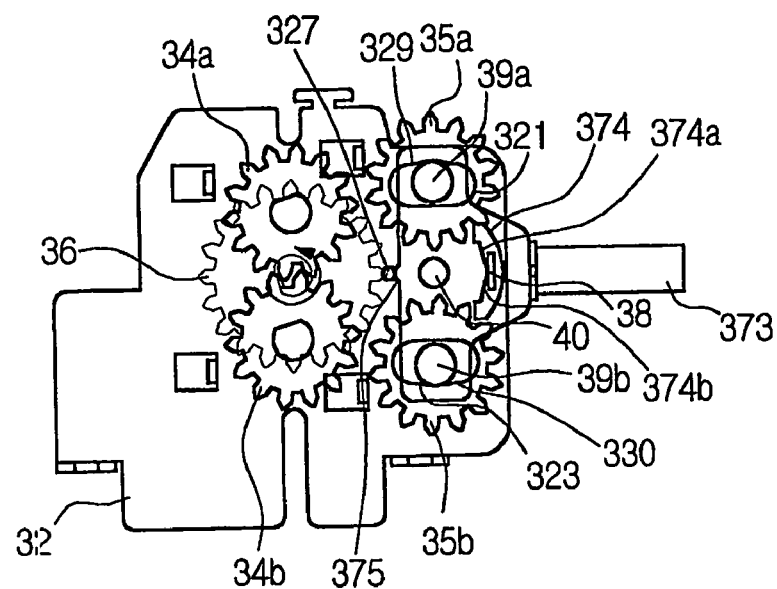

FIGS. 16 to 18 are views explaining a forward rotation state, a backward rotation state and a stopping state of the roller in the fourth embodiment of the present invention, just as described in FIGS. 12 to 14 of the third embodiment.

It can be seen that the position of the supporting bar 327 is fixed more firmly since the supporting bar 327 is hung on the supporting hanging projections 357. Also, since the positions of the upper and lower gear shafts 39a and 39b are fixed to the protrusions 318, 319, 329 and 330, the position of the manipulating member 37 can be fixed more firmly.

Fifth Embodiment

A roller driving apparatus of a laminator in accordance with a fifth embodiment of the present invention is identical to the above-described third embodiment in many respects. Meanwhile, compared with the third embodiment of the present invention, the fifth embodiment of the present invention has differences in a topology structure of a fixing spring 43, and fixing structure and method of the supporting frame 31b and the motor fixing member 32. Hereinafter, such a different structure will be described below in detail.

Figure 19:
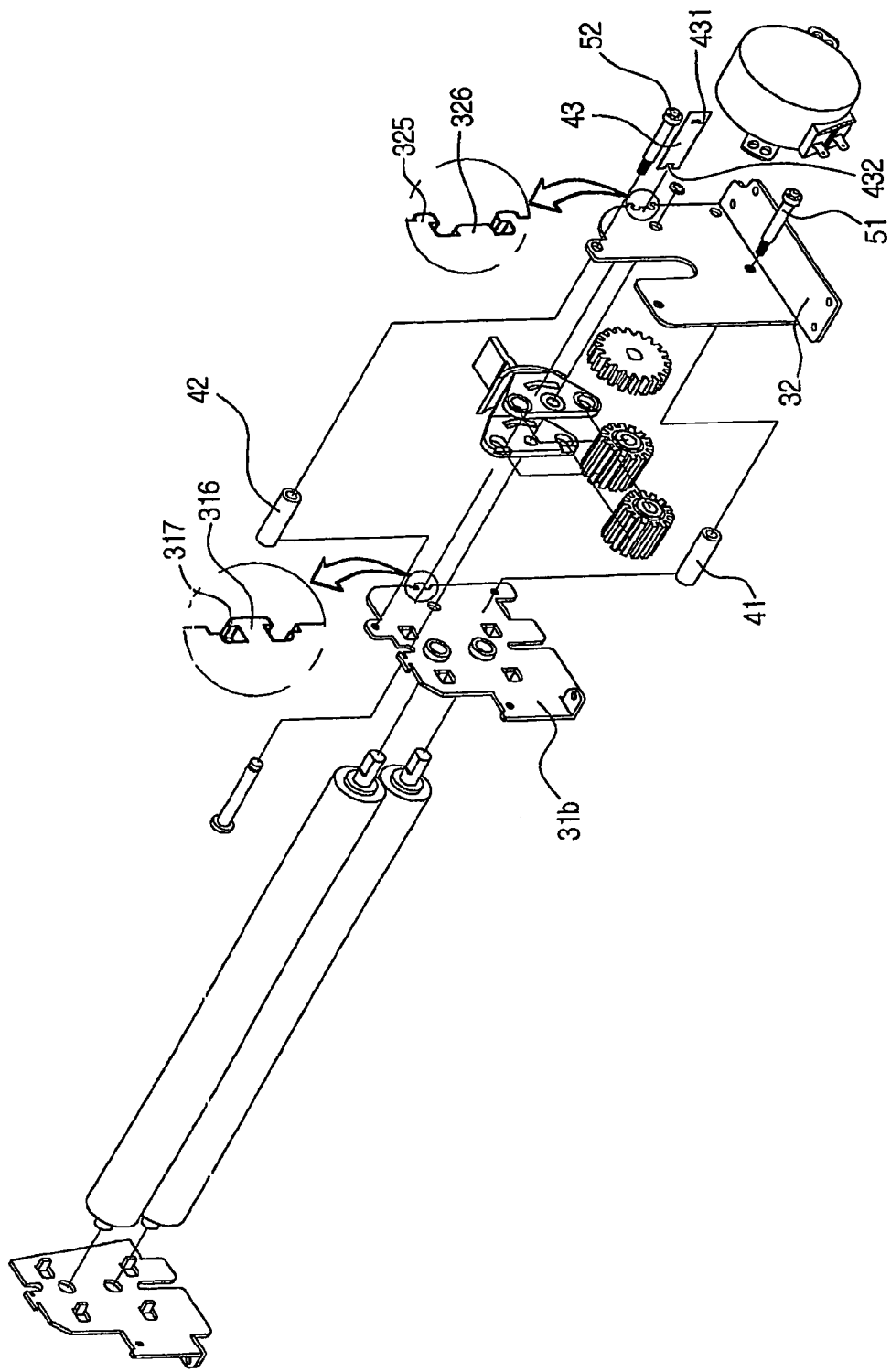
FIG. 19 is an exploded perspective view showing a roller driving apparatus of a laminator in accordance with a fifth embodiment of the present invention.

FIG. 19 is an exploded perspective view showing the roller driving apparatus of the laminator in accordance with the fifth embodiment of the present invention.

Referring to FIG. 19, the fifth embodiment of the present invention is identical to the third embodiment in many respects. However, the fifth embodiment of the present invention further includes a first spacer 41 and a second spacer 42 formed between a right supporting frame 31b and a motor fixing member 32 to stably and correctly maintain an interval therebetween. Also, first and second coupling members 51 and 52 are inserted into the central portion of the spacers 41 and 42, and both ends of the first and second coupling members 51 and 52 are firmly fixed to the right supporting frame 31b and the motor fixing member 32.

Meanwhile, both ends of the spacers 41 and 42 are in contact with inner faces of the right supporting frame 31b and the motor fixing member 32 so that the interval between the right supporting frame 31b and the motor fixing member 32 can be always maintained correctly and constantly. According to this structure, each position of the roller gears 34, the connection gears 35 and the motor gear 36 can be correctly maintained, thereby securing a stable transfer of the rotational force.

Also, a remarkable characteristic of the fifth embodiment in accordance with the present invention is the topology of the fixing spring. The fixing spring 43 includes a position fixing hole 431 and a position fixing groove 432. The position fixing hole 431 is formed on one end of the fixing spring 43 to correctly set the position of the fixing spring 43. The position fixing groove 432 is formed in a depressed shape on the other end of the fixing spring 43 to set correctly set the position of the fixing spring 43.

Additionally, a position fixing protrusion 316 and a left separation preventing projection 317 are further formed on an outer circumference of the right supporting frame 31b to which the position fixing groove 432 is set. The right supporting frame 31b is positioned to the position fixing protrusion 316, and the left separation preventing projection 317 is formed extending upward and downward from the end of the position fixing protrusion 316 so that the positioned fixing spring 43 may not be separated outward.

Further, a spring hanging protrusion 326 and a right separation preventing projection 325 are formed on an outer circumference of the motor fixing member 32 to which the position fixing hole 431 is set. The position fixing hole 431 is inserted into the spring hanging protrusion 326, and the right separation preventing projection 325 is formed extending upward and downward from the outer circumference of the motor fixing member 32 adjacent to the spring hanging protrusion 326.

A procedure of positioning the fixing spring 43 according to the above-described structure will be described below. On end of the fixing spring 43 having the position fixing groove 432 is inserted into the motor fixing member 32, so that the position fixing groove 432 is positioned to the position fixing protrusion 316 of the right supporting frame 31b. Then, in a state that the position fixing hole 431 is aligned with the spring hanging protrusion 326, the position fixing hole 431 is pushed inward by a predetermined external force so that the other end of the fixing spring 43 is inserted and fixed.

The roller driving apparatus of the laminator with the above-described structure can be operated more stably and reliably than the prior art.

Sixth Embodiment

A roller driving apparatus of a laminator in accordance with a sixth embodiment of the present invention is identical to the above-described fifth embodiment in many respects. On the other hand, a predetermined fixing member for firmly fixing the changed position of the manipulating member 37 is further formed.

Figure 20:
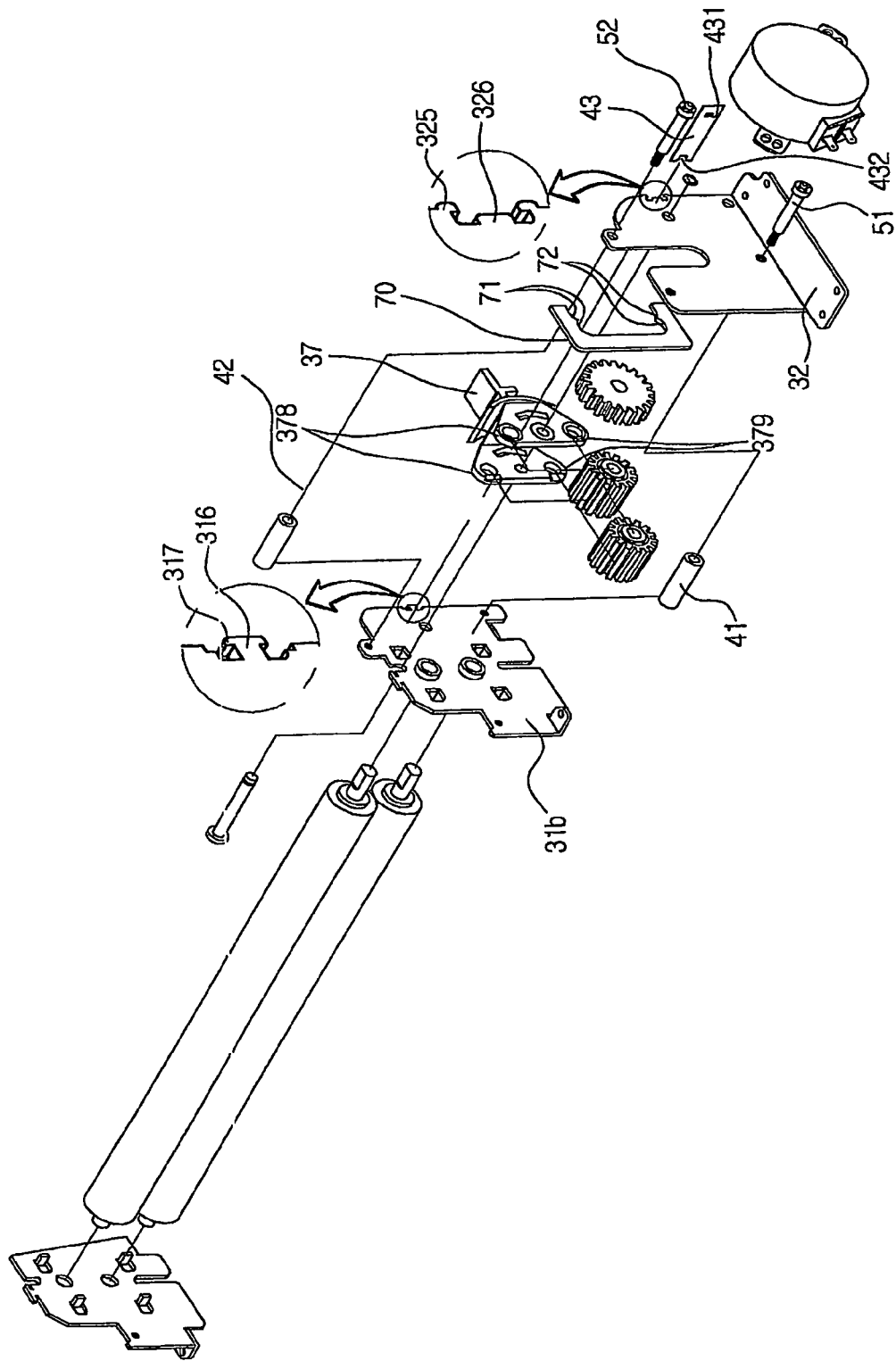
FIG. 20 is an exploded perspective view showing a roller driving apparatus of a laminator in accordance with a sixth embodiment of the present invention.

FIG. 20 is an exploded perspective view showing the roller driving apparatus of the laminator in accordance with the sixth embodiment of the present invention.

Referring to FIG. 20, the sixth embodiment of the present invention includes upper and lower portions 378 and 379 and a fixing member 70. The upper and lower portions 378 and 379 are formed in an arc shape on upper and lower portions of the manipulating member 37. The fixing member 70 includes upper and lower inserting portions 71 and 72 formed in an outward shape similar to the upper and lower portions 378 and 379. Meanwhile, since the upper and lower portions 378 and 379 are formed in the arc shape, the manipulating member 37 can be smoothly moved.

The fixing member 70 is fixedly formed on inner faces of the motor fixing member 32 and/or the right supporting frame 31b. Also, a predetermined elasticity deformation can be obtained by forming the fixing member 70 using a plastic material. Further, the fixing member 70 can be fixed on the inner faces of the motor fixing member 32 or/and the right supporting frame 31b using a coupling member such as a bolt.

Furthermore, the upper inner-inserting portion 71 and/or the lower inner-inserting portion 72 are/is adjacently formed spaced away from a predetermined protrusion, thereby supporting a stable operation of the manipulating member 37.

Simply explaining the operation of the fixing member 70, so as to rotate the roller in the forward or backward rotation, the user inserts the upper and lower portions 378 and 379 of the manipulating member 37 into the upper and lower inner-inserting portions 71 and 72. Then, the position of the inserted upper and lower portions 378 and 379 is firmly fixed by the topology of the upper and lower inner-inserting portions 71 and 72, thereby supporting the operation of the laminator.

Figure 21:
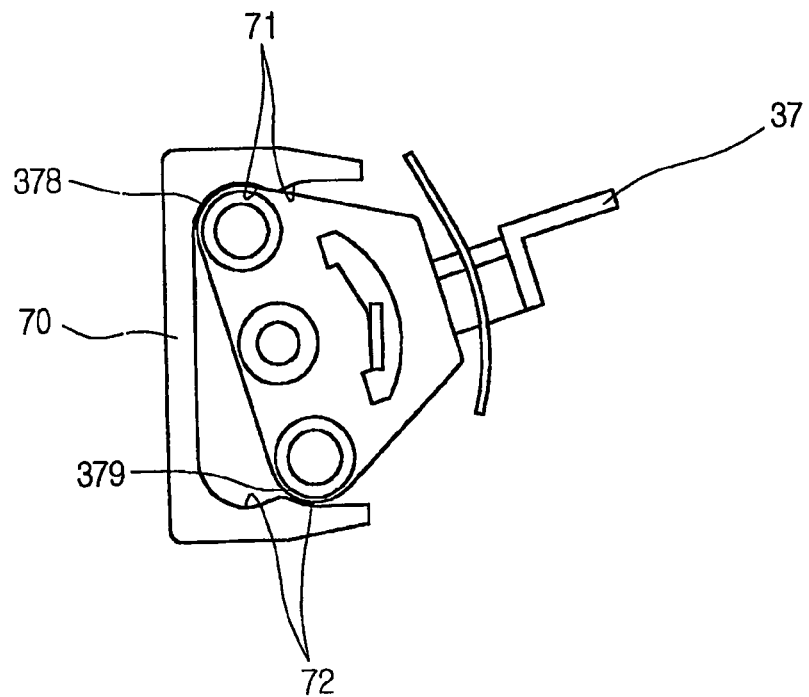
FIGS. 21 and 22 are views explaining an operation of the roller driving apparatus of the laminator in the sixth embodiment of the present invention.
Figure 22:
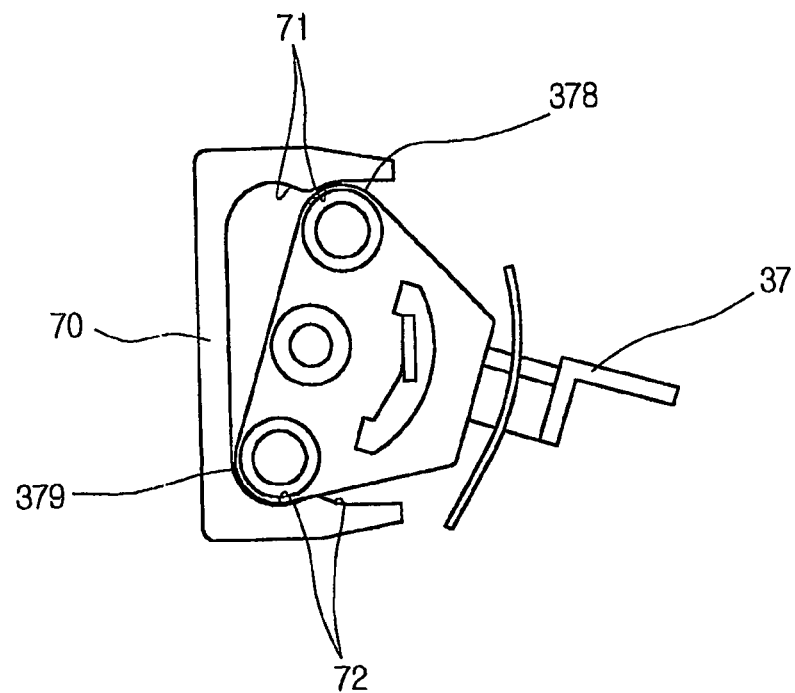

FIGS. 21 and 22 are views explaining the operation of the roller driving apparatus of the laminator in the sixth embodiment of the present invention.

FIG. 21 is a view showing the manipulating member 37 supported in the forward rotational direction of the roller. In more detail, the upper portion 378 of the manipulating member 37 is supported by the upper inner-inserting portion 71 disposed at the left side of the fixing member 70, and the lower portion 379 of the manipulating member 37 is supported by the lower inner-inserting portion 72 disposed at the right side of the fixing member 70. The upper and lower inner-inserting portions 71 and 72 are formed in the same outward shape as the upper and lower portions 378 and 379 of the manipulating member 37, so that they are not separated until a predetermined external force is applied thereto.

FIG. 22 is a view showing the manipulating member 37 supported in the backward rotational direction of the roller. In more detail, the upper portion 378 of the manipulating member 37 is supported by the upper inner-inserting portion 71 disposed at the right side of the fixing member 70 and the lower portion 379 of the manipulating member 37 is supported by the lower inner-inserting portion 72 disposed at the left side of the fixing member 70. The upper and lower inner-inserting portions 71 and 72 are formed in the same outward shape as the upper and lower portions 378 and 379 of the manipulating member 37, so that they are not separated until a predetermined external force is applied thereto.

According to the above-described structures of fixing the position of the manipulating member 37, the position of the manipulating member 37 can be fixed more firmly. Further, if the user wants, the manipulating member 37 can be manipulated in the rotational direction of the roller using an external force applied by the user.

By using the various embodiments described above, the user can conveniently remove the film from the laminator or operate the laminator at a low cost by using one-way rotating motors.

Although the preferred embodiments of the present invention have been disclosed for illustrative purposes, those skilled in the art will appreciate that various modifications, additions and substitutions can be made without departing from the scope and spirit of the invention as defined in the accompanying claims.

INDUSTRIAL APPLICABILITY

A roller driving apparatus of a laminator in accordance with the present invention can implement forward and backward rotations of the roller to the user's intensions by using only the driving of the motor rotating in one-way direction, thereby improving much more a convenience in a use of the laminator.

Further, through a simple modification of a structure, it is possible to pull out the film from the small-size laminator. Therefore, compared with a large-sized laminator having the same function, the present invention has more advantageous merits in terms of a manufacturing cost.

What is claimed is:

1. A roller driving apparatus of a laminator comprising:
   a pair of supporting frames facing each other;
   upper and lower rollers formed between the supporting frames;
   upper and lower roller gears coupled with each one end of the upper and lower rollers passing through one supporting frame, for transferring rotational force to the upper and lower rollers, wherein the upper and lower roller gears are meshed with each other;
   at least one connection gear selectively coupled to either the upper roller gear or the lower roller gear, for transferring rotational force;
   a motor fixing means disposed outside the one supporting frame, for fixing a motor;
   a motor gear fixed to a rotational shaft of the motor, for selectively transferring the rotational force of the motor to the connection gear;
   a manipulating means disposed between the one supporting frame and the motor fixing means, for manipulating a transfer state of the rotational force from the motor gear to either the upper roller gear or the lower roller gear by moving the connection gear using an external force of the user, wherein a center of the connection gear is coupled to the manipulating means; and
   a fixing means for stably fixing the manipulating means.

2. The roller driving apparatus of a laminator as recited in claim 1, wherein the manipulating means includes:
   a manipulating member, both ends of the connection gear being coupled to one side of the manipulating member;
   a manipulating bar formed on the manipulating member and extended to the other side of the manipulating member; and
   a central shaft inserted into the one supporting frame, the manipulating member and the motor fixing means, for serving as a rotational center of the manipulating member.

3. The roller driving apparatus of a laminator as recited in claim 2, wherein the manipulating member includes ellipse-shaped central-shaft inserting holes into which the central shaft is inserted; and
   wherein both the one supporting frame and the motor fixing means include circular fixing holes into which the central shaft is inserted, respectively.

4. The roller driving apparatus of a laminator as recited in claim 1, wherein hanging protrusions are protrusively formed on an outer face of the manipulating means; and
   wherein the one supporting frame and/or the motor fixing means includes upper hanging holes and/or stopping holes and/or lower hanging holes into which the hanging protrusions are inserted, for correctly supporting a position of the manipulating means.

5. The roller driving apparatus of a laminator as recited in claim 1, wherein the manipulating means includes:
   link panels formed in contact with the one supporting frame and the motor fixing means, both ends of upper and lower connection gears being coupled to the link panels;
   a central shaft fixed to the one supporting frame and the motor fixing means, for serving as a rotational center of the link panels; and
   a manipulating member fixed to the upper connection gear or the lower connection gear, for transferring the rotational force by meshing the upper connection gear or the lower connection gear with the motor gear and the roller gear through an appliance of an external force of the user.

6. The roller driving apparatus of a laminator as recited in claim 5, wherein the fixing means includes:
   at least two hanging grooves formed on one side of the manipulating member; and
   a hanging part to which the hanging grooves are inserted, so that a position of the connection gear is fixed according to that of the manipulating member.

7. The roller driving apparatus of a laminator as recited in claim 6, wherein the hanging part is an external case.

8. The roller driving apparatus of a laminator as recited in claim 6, further comprising a spring for coupling the manipulating member and other supporting point to firmly supporting the position of the manipulating member at an operation of the laminator.

9. The roller driving apparatus of a laminator as recited in claim 5, further comprising an arc-shaped shaft guide formed on the one supporting frame and the motor fixing means, into which the upper and lower connection gears are inserted, thereby guiding rotational operations of the upper and lower connection gears.

10. The roller driving apparatus of a laminator as recited in claim 1, wherein the manipulating means includes:
    a manipulating member to which upper and lower connection gears are coupled, for applying an external force of the user in up and down directions; and
    a central shaft inserted into a central portion of one side of the manipulating member and fixed to the one supporting frame and the motor fixing means.

11. The roller driving apparatus of a laminator as recited in claim 10, wherein the fixing means includes:
    a spring of which both ends are fixed to the one supporting frame and/or the motor fixing means; and
    a spring guide formed on the manipulating member and to which the spring is inserted, and elasticity force of the spring being applied to the spring guide.

12. The roller driving apparatus of a laminator as recited in claim 10, wherein the spring guide is formed in one pair on the manipulating member and includes at least two planar surfaces.

13. The roller driving apparatus of a laminator as recited in claim 10, further comprising:
    circular central holes formed on both the supporting frames and the motor fixing means, the central shaft being inserted into the circular central holes; and
    upper and lower shaft guides into which the upper and lower connection gears are inserted to achieve a smooth movement of the upper and lower connection gears according to a movement of the manipulating means.

14. The roller driving apparatus of a laminator as recited in claim 10, further comprising at least one spacer formed between the one supporting frame and the motor fixing means to correctly and stably maintain an interval therebetween.

15. The roller driving apparatus of a laminator as recited in claim 10, further comprising:
    at least one spacer formed in contact with inner faces of the one supporting frame and the motor fixing means; and a screw inserted into an inside of the spacer to fix the spacer to the one supporting frame and the motor fixing means.

16. The roller driving apparatus of a laminator as recited in claim 10, further comprising:
a position fixing hole formed on one end of the spring, for fixing a position of the spring;
a spring hanging protrusion formed on an outer circumference of either the one supporting frame or the motor fixing means, for fixing a position of the spring, wherein the position fixing hole engages the spring hanging protrusion; and
a right separation preventing projection extended upward and downward from the outer circumference of the spring hanging protrusion.

17. The roller driving apparatus of a laminator as recited in claim 10, further comprising:
a position fixing groove formed in a depressed shape on an outer circumference of the other side of the spring;
a spring position fixing protrusion formed on an outer circumference of either the one supporting frame or the motor fixing means, for setting a position of the spring, wherein the position fixing groove is set to the spring position fixing protrusion; and
a left separation preventing projection for preventing the set fixed spring from being separated.

18. A roller driving apparatus of a laminator comprising:
a pair of supporting frames facing each other;
upper and lower rollers disposed between the supporting frames;
upper and lower roller gears coupled with each one end of the upper and lower rollers passing through one supporting frame, for transferring rotational force to the upper and lower rollers, wherein the upper and lower roller gears are meshed with each other;
a connection gear selectively coupled with either the upper roller gear or the lower roller gear by an external force, for transferring a rotational force;
a motor fixing means disposed outside the one supporting frame, for fixing a motor;
a motor gear fixed to a rotational shaft of the motor, for selectively transferring the rotational force of the motor to the connection gear by an external force;
a manipulating means to one side of which both ends of the connection gear are coupled;
a central shaft inserted into the one supporting frame, the manipulating means and the motor fixing means, for serving as a rotational center of the manipulating means;
a hanging protrusion protrusively formed on at least one outer face of the manipulating means; and
upper hanging holes and/or stopping holes and/or lower hanging holes formed on the one supporting frame and/or the motor fixing means, for correctly supporting a position of the manipulating means.

19. The roller driving apparatus of a laminator as recited in claim 18, wherein the manipulating means includes ellipse-shaped central-shaft inserting holes into which the central shaft is inserted; and
wherein both the one supporting frame and the motor fixing means include circular fixing holes into which the central shaft is inserted, respectively.

20. The roller driving apparatus of a laminator as recited in claim 18, wherein the manipulating means includes a manipulating bar formed on the manipulating means and extended to the other side of the manipulating means, such that in use an external force of the user is applied to the manipulating bar.

21. A roller driving apparatus of a laminator comprising:
a pair of supporting frames facing each other;
upper and lower rollers formed between the supporting frames;
upper and lower roller gears coupled with each one end of the upper and lower rollers passing through one supporting frame, for transferring each rotational force to the upper and lower rollers, wherein the upper and lower roller gears are meshed with each other;
a motor fixing means disposed outside the one supporting frame, for fixing a motor;
upper and lower connection gears selectively coupled to either the upper roller gear or the lower roller gear, for transferring rotational force;
link panels being formed in contact with the one supporting frame and the motor fixing means, both ends of the upper connection gear and the lower connection gear being coupled to the link panels;
a central shaft fixed to the one supporting frame and/or the motor fixing means, for serving as a rotational center of the link panels;
a manipulating means fixed to the upper connection gear or the lower connection gear, for transferring the rotational force by meshing the upper connection gear or the lower connection gear with the motor gear and the roller gear through an appliance of an external force of the user;
at least two hanging grooves formed on one side of the manipulating means, for supporting a position of the manipulating means at an operation of the laminator; and
a hanging means for fixing a position of the manipulating means into which the hanging grooves are inserted.

22. The roller driving apparatus of a laminator as recited in claim 21, wherein the hanging grooves are formed on a lower portion of the manipulating means.

23. The roller driving apparatus of a laminator as recited in claim 21, wherein the hanging means is an external case.

24. The roller driving apparatus of a laminator as recited in claim 21, further comprising a spring for coupling the manipulating means and other supporting point to firmly supporting the position of the manipulating means at an operation of the laminator.

25. The roller driving apparatus of a laminator as recited in claim 21, further comprising a spring for coupling the manipulating means and other supporting point disposed at a lower portion of the manipulating means, thereby firmly supporting the position of the manipulating means at an operation of the laminator.

26. The roller driving apparatus of a laminator as recited in claim 21, further comprising an arc-shaped shaft guide formed on the one supporting frame and the motor fixing means, into which the upper and lower connection gears are inserted, thereby guiding rotational operations of the upper and lower connection gears.

27. The roller driving apparatus of a laminator as recited in claim 21, wherein the link panels are formed in contact with inner faces of the motor fixing means and the one supporting frame.

28. A roller driving apparatus of a laminator comprising:
a pair of supporting frames facing each other;
upper and lower rollers formed between the supporting frames;

upper and lower roller gears coupled with each one end of the upper and lower rollers passing through one supporting frame, for transferring each rotational force to the upper and lower rollers, wherein the upper and lower roller gears are meshed with each other;

a pair of connection gears selectively coupled to either the upper roller gear or the lower roller gear, for transferring rotational force;

a motor fixing means formed outside the one supporting frame, for fixing a motor;

a motor gear selectively meshed with the connection gears, for selectively transferring a rotational force of the motor to the connection gears;

a manipulating means for selectively transferring the rotational force to the upper and lower connection gears through an external force, wherein central shafts of the upper and lower connection gears are fixed to upper and lower portions of the manipulating means;

a central shaft inserted into a central portion of the manipulating means and fixed to both the one supporting frame and the motor fixing means;

a spring guide formed on the manipulating means, for stably fixing a position of the manipulating means; and a spring of which one side is fixed to the one supporting frame and/or the motor fixing means, for supporting the position of the manipulating means at a rotation of the roller.

29. The roller driving apparatus of a laminator as recited in claim 28, wherein the spring guide is formed on a portion of the manipulating means and includes at least two planar surfaces.

30. The roller driving apparatus of a laminator as recited in claim 28, further comprising:

circular central holes formed on both the supporting frames and the motor fixing means, the central shaft being inserted into the circular central holes; and upper and lower shaft guides formed on the supporting frames and the motor fixing means and into which the upper and lower connection gears are inserted, so that the upper and lower connection gears are smoothly moved according to a movement of the manipulating means.

31. The roller driving apparatus of a laminator as recited in claim 28, further comprising at least one spacer formed between the one supporting frame and the motor fixing means to correctly and stably maintain an interval therebetween.

32. The roller driving apparatus of a laminator as recited in claim 28, further comprising a screw formed between the one supporting frame and the motor fixing means to fix the positions of the one supporting frame and the motor fixing means.

33. The roller driving apparatus of a laminator as recited in claim 28, wherein one end of the spring is pushed into the one supporting frame and/or the motor fixing means.

34. The roller driving apparatus of a laminator as recited in claim 28, further comprising:

a position fixing hole formed on one end of the spring, for fixing a position of the spring;

a spring hanging protrusion formed on an outer circumference of either the one supporting frame or the motor fixing means, for fixing a position of the spring, wherein the position fixing hole is inserted into the spring hanging protrusion; and a right separation preventing projection extended upward and downward from the outer circumference of the spring hanging protrusion.

35. The roller driving apparatus of a laminator as recited in claim 28, a position fixing groove formed in a depressed shape on an outer circumference of the other side of the spring;

a spring position fixing protrusion formed on an outer circumference of either the one supporting frame or the motor fixing means, for fitting a position of the spring, wherein the spring position fixing protrusion is inserted into the position fixing groove; and a left separation preventing projection for preventing the fixed spring from being separated.

36. The roller driving apparatus of a laminator as recited in claim 28, further comprising:

supporting bar inserting holes formed on predetermined positions of the right supporting frame and the motor fixing means, respectively;

a supporting bar of which both ends are inserted into the supporting bar insertion holes; and a supporting bar hanging projection protrusively formed on an end of the manipulating means and contacted with the supporting bar, for fixing more firmly a position of the supporting bar.

37. The roller driving apparatus of a laminator as recited in claim 28, further comprising an upper shaft guide and/or a lower shaft guide for firmly fixing a moved position of the gear shafts, wherein the upper shaft guide and/or the lower shaft guide include(s) protrusions protusively formed toward an inner circumference on predetermined positions of the supporting frame and/or the motor fixing means, the upper gear shaft and/or the lower gear shaft inserted into a center of the connection gears being disposed at the supporting frame and/or the motor fixing means.

38. A roller driving apparatus of a laminator comprising:

a pair of supporting frames facing each other;

upper and lower rollers formed between the supporting frames;

upper and lower roller gears coupled with each one end of the upper and lower rollers passing through on supporting frame, for transferring rotational force to the upper and lower rollers, wherein the upper and lower roller gears are meshed with each other;

at least one connection gear selectively coupled to either the upper roller gear or the lower roller gear, for transferring rotational force;

a motor fixing means disposed outside the one supporting frame, for fixing a motor;

a motor gear fixed to a rotational shaft of the motor, for selectively transferring the rotational force of the motor to the connection gear;

a manipulating means disposed between the one supporting frame and the motor fixing means, for manipulating a transfer state of the rotational force from the motor gear to either the upper roller gear or the lower roller gear by moving the connection gear using an external force of a user, wherein a center of the connection gear is coupled to the manipulating means; and a fixing means fixed to an inner face of the motor fixing means and/or the one supporting frame, for stably fixing a position of the manipulating means, wherein a pair of inner-inserting portions are formed in the same outward shape as a portion of the manipulating means.

39. The roller driving apparatus of a laminator as recited in claim 38, wherein upper and lower portions of the manipulating means are formed in the same shape as the inner-inserting portions.

40. The roller driving apparatus of a laminator as recited in claim 38, wherein the inner-inserting portions are formed in an arc shape on the upper and lower portions of the fixing means in one pair, respectively, thereby fixing the position of the manipulating means.

* * * * *